United States Patent [19]

Ball

[11] Patent Number: 5,029,599
[45] Date of Patent: Jul. 9, 1991

[54] BUTTERFLY VALVE METHOD AND APPARATUS

[75] Inventor: Larry K. Ball, Chandler, Ariz.

[73] Assignee: Allied-Signal Inc., Morris Township, Morris County, N.J.

[21] Appl. No.: 534,054

[22] Filed: Jun. 6, 1990

Related U.S. Application Data

[63] Continuation-in-part of Ser. No. 374,897, Jun. 30, 1989.

[51] Int. Cl.$^5$ ................................................ F16K 1/22
[52] U.S. Cl. ....................................... 137/1; 251/215;
251/228; 251/248; 251/283; 251/308
[58] Field of Search ............... 137/1; 251/56, 58, 215,
251/218, 227, 228, 248, 281, 283, 305, 308

[56] References Cited

U.S. PATENT DOCUMENTS 2,910,266 10/1959 Condello ......................... 251/56 X
3,065,950 11/1962 Goldberg ........................... 251/160
4,093,180 6/1978 Strabala ............................. 251/248
4,840,349 6/1989 Peter ............................... 251/248 X Primary Examiner—Robert G. Nilson
Attorney, Agent, or Firm—Joseph R. Black; James W. McFarland; Terry I. Miller

[57] ABSTRACT a balanced butterfly valve method and apparatus having a valve plate pivotally supported within a mounting body. The valve plate is capable of both rotational and translational movement in response to rotation of an input shaft. A spring is provided to resist translational movement of the valve plate. Differential gearing is used to convert rotational movement of the input shaft into rotational and translational movement of the valve plate depending on the relationship between the force exerted by the spring and the torque exerted on the valve plate by the fluid.

5 Claims, 6 Drawing Sheets

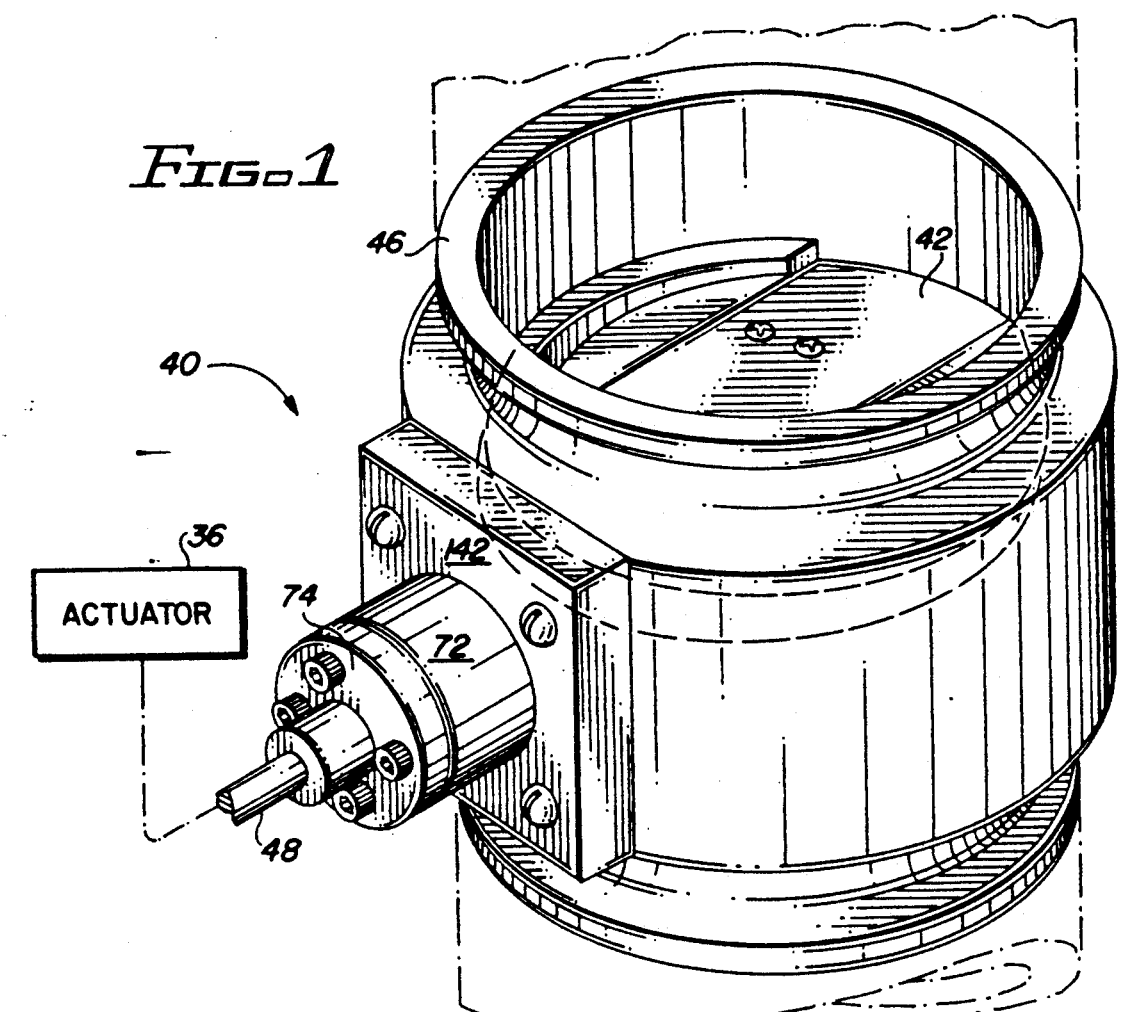
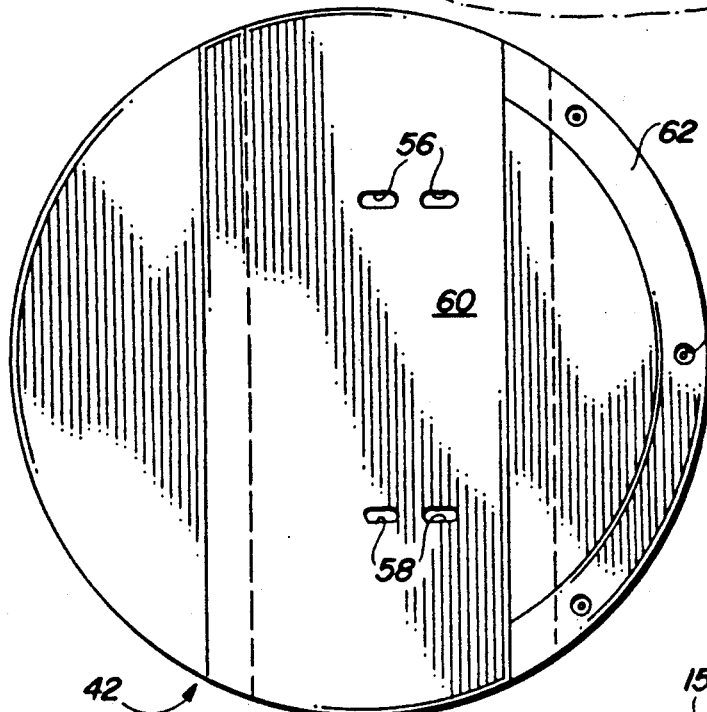
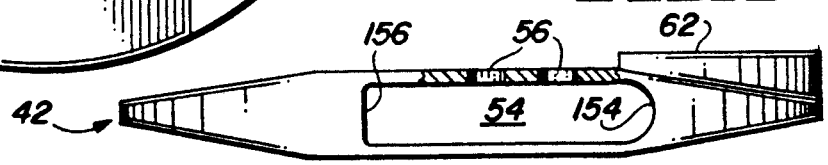

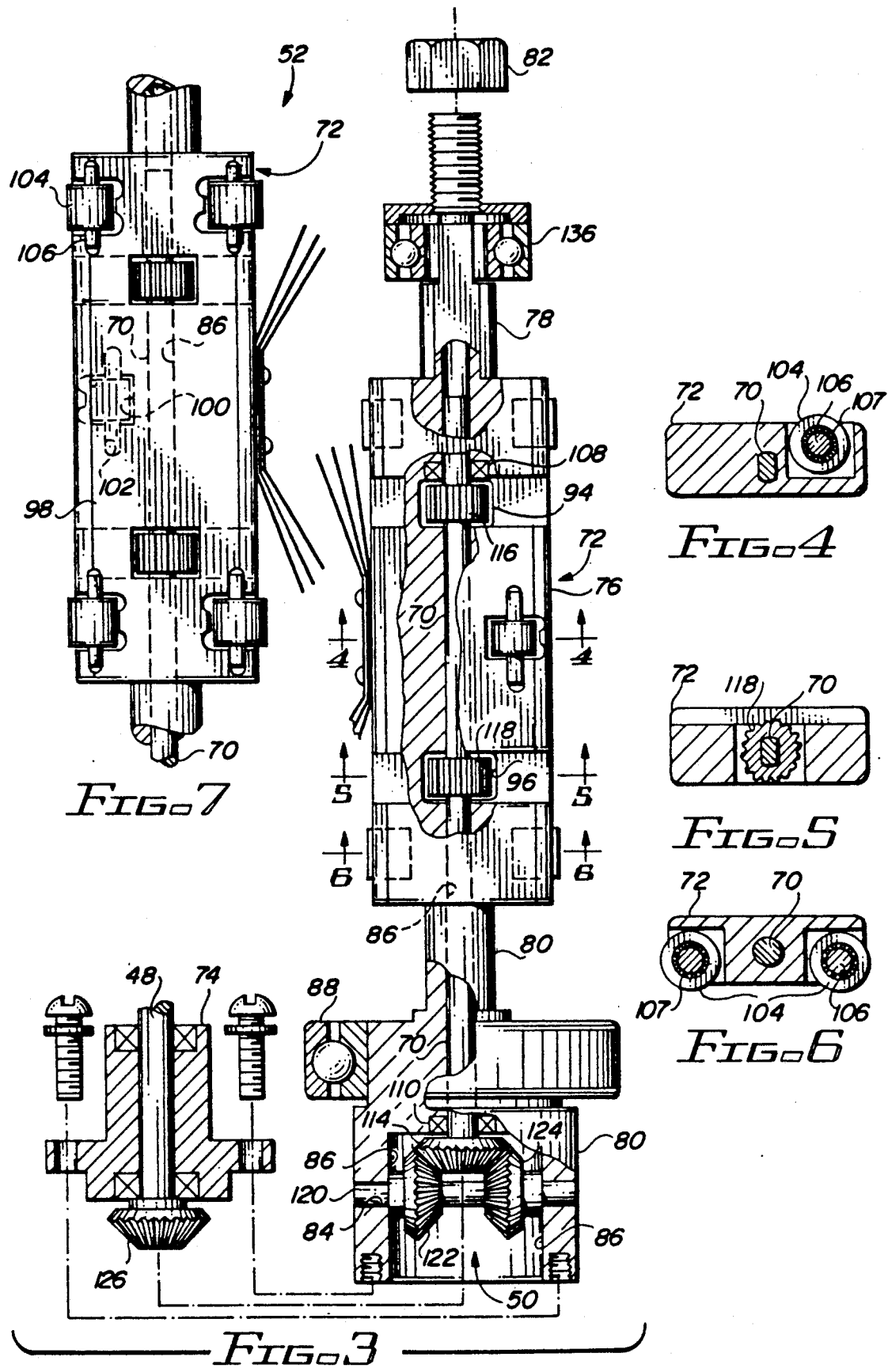

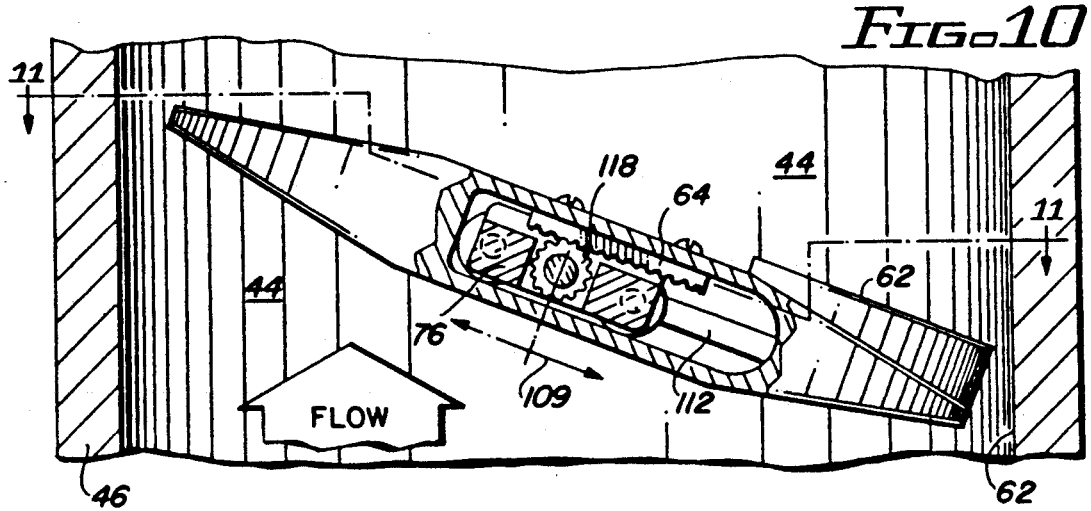
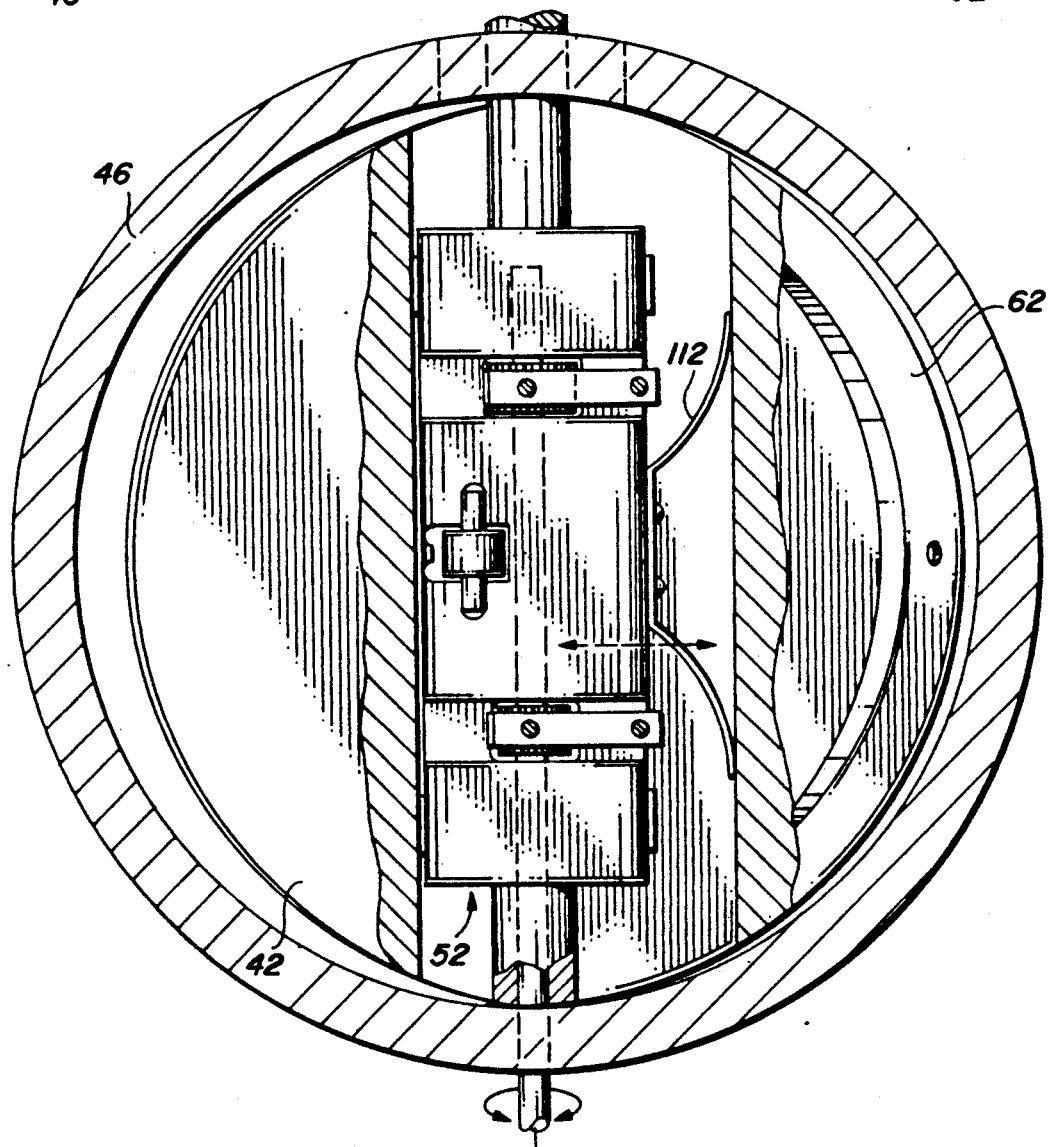

BUTTERFLY VALVE METHOD AND APPARATUS

This application is a continuation-in-part of pending application Ser. No. 374,897, filed on June 30, 1989.

Reference is made to the following copending and commonly-owned U.S. patent applications which disclose balanced-torque valves: Ser. No. 374,897 pending, filed on Jun. 30, 1989, Ser. No. 395,234 pending, filed on Aug. 17, 1989; Ser. No. 422,354 pending, filed on Oct. 16, 1989; and Ser. No. 426,921 pending, filed on Oct. 24, 1989.

TECHNICAL FIELD

This invention relates generally to butterfly valve methods and apparatus, and more specifically to those which employ or incorporate structure that permits translational movement of the valve plate relative to the pivot mechanism.

BACKGROUND OF THE INVENTION

In butterfly valves, translational movement of the valve plate relative to the pivot mechanism can be used to effect dynamic torque balancing, and to facilitate actuation by using the torque exerted by fluid on the plate to rotate the latter. To applicants' knowledge, these principles were first set forth in the above-referenced patent application Ser. No. 374,897, filed on June 30, 1989. They are schematically illustrated in FIGS. 12A–12C of the present application, wherein numerals 20, 22, 24, 26, and 28 indicate a valve plate, a pivot shaft, a duct, a bracket intersecuring the shaft and plate, and the direction of flow respectively. Arrow 30 and numeral 32 indicate the center of pressure associated with the forces exerted by fluid on the plate 20, and the pivot line about which the plate is rotatable.

In FIG. 12A, the shaft 22 is centered in relation to the longitudinal dimension of the plate 20 and the plate is in a closed position. The center of pressure 30 is aligned with the pivot line 32, so the net torque exerted by the fluid on the plate 20 is zero. If the plate 20 is rotated to an open position as illustrated in FIG. 12B, and translated relative to the shaft 22 so that the center of pressure 30 is aligned with the pivot line 32 as illustrated in FIG. 12C, then the plate is effectively torque-balanced and the flow rate associated with the rotational angle 34 can be maintained with minimal input force required from the actuator 36. If the translational movement is too limited in range to achieve torque balancing at all rotational positions of the plate 20, it can still be used to advantage in minimizing the net torque exerted by the fluid, thus still minimizing the input force required from the actuator 36.

If it is desired to change the rotational angle 34, then the plate 20 can be translated relative to the shaft 22 in the appropriate direction to effect a misalignment of the center of pressure 30 with the pivot line 32, thus increasing the net fluid dynamic torque, and the force required to effect the change is exerted in whole or in part by the fluid conveyed in the duct 24.

Butterfly valves that are designed to provide for translational movement of the plate 20 relative to the shaft 22, for either or both of the above-described purposes, are referred to herein as "balanced-torque" butterfly valves.

Upon reflection, it will be understood that the use of balanced-torque butterfly valves in applications which demand a rotational angle 34 corresponding to a closed position presents the problem of providing for translational movement while also providing for initial opening of the valve plate 20. Several arrangements have been proposed for initial opening of the plate 20. These include the following: (1) movably mounting the shaft 22 in the duct 24 so that the former is displaceable in a direction perpendicular to its own longitudinal axis, thus effecting a misalignment of the center of pressure 30 with the pivot line 32 at the zero angle; (2) providing a pilot valve through the plate, the pilot valve being actuated open at the zero angle in order to change the location of the center of pressure; and (3) mounting an actuator on the plate, the actuator having an output shaft revolvably secured to the pivot shaft 22, and using the actuator to effect both rotation for initial opening and translation for subsequent torque balancing.

The above-described arrangements require unconventional structures with unconventional actuation schemes. In many applications it may be desirable to provide for both initial opening and subsequent translation using an actuation scheme which is conventional in the sense that only a single externally-disposed actuator 36 is required to operate the valve. In addition, it is generally desirable to minimize the torque requirements of the actuator 36 so that a smaller actuator can be used.

SUMMARY OF THE INVENTION

This invention provides a balanced-torque butterfly valve method and apparatus. The term "balanced-torque" is meant to convey that the method employs a butterfly valve structure adapted to provide for translational movement of the valve plate relative to the pivot mechanism about which the valve plate is pivotal in the flow path; or, in the context of the apparatus, that the apparatus incorporates such structure. The advantages associated with such movement are described in the above BACKGROUND section.

In a method for exploiting net torque to facilitate control of a butterfly valve as described and claimed herein, the valve plate is moved from a first rotational position toward a second rotational position while being subjected to the net torque exerted thereon by fluid conveyed along the flow path. The net torque resists the forementioned movement and tends to rotate the valve plate back toward the first rotational position. The movement of the valve plate is characterized by a succession of rotational and translational movements, the translational movements serving to facilitate the rotational movements by decreasing the net torque. Although the overall movement may be substantially continuous, it is characterized by rotational and translational components, as will be understood from the entirety of the disclosure provided herein.

In the apparatus described and claimed herein, both rotational and translational movement is provided for by a butterfly valve which comprises in combination: a mounting body defining a portion of a flow path for a fluid to be conveyed therethrough; a valve plate supported within and transecting the flow path; pivot means journalled in the mounting body for supporting the valve plate; a differential gear operably connected to the pivot means to transmit torque thereto; and an input shaft operably connected to the differential gear to apply input torque to the latter. The differential gear functions as a mechanical resolver through which either rotational or translational movement of the valve plate is produced in response to rotation of the input shaft. The movement produced depends on the extent to which one of these types of movement is impeded.

The apparatus may further comprise a spring or equivalent biasing mechanism which resists translational movement of the valve plate. In use of that arrangement, the differential gear functions as a mechanical resolver through which rotational movement of the input shaft is converted to rotational or translational movement of the valve plate, depending on the relationship between the force exerted by the biasing mechanism and the net torque exerted on the valve plate by the fluid.

BRIEF DESCRIPTION OF THE DRAWINGS

FIG. 1 is a perspective view of an assembled butterfly valve. Actuation of the valve is represented.

FIG. 3 is a partially elevational, partially cross-sectional, and partially exploded view of various components illustrated in FIG. 2, including a pivot mechanism and a differential gear.

FIGS. 4–6 are cross-sectional views taken along the lines indicated in FIG. 3.

FIG. 7 is an elevational and truncated view of the pivot mechanism.

FIG. 8 is a top elevation of the valve plate illustrated in FIGS. 1 and 2.

FIG. 9 is a side elevation, in partial cross-section, of the valve plate illustrated in FIG. 8.

FIG. 10 is a partial, cross-sectional and partially elevational view of the butterfly valve, as viewed in a direction parallel to both the valve plate and the pivot mechanism.

FIG. 11 is an elevational and partially fragmented view taken along lines 11—11 of FIG. 10.

DESCRIPTION OF THE PREFERRED EMBODIMENT

Figure 2:
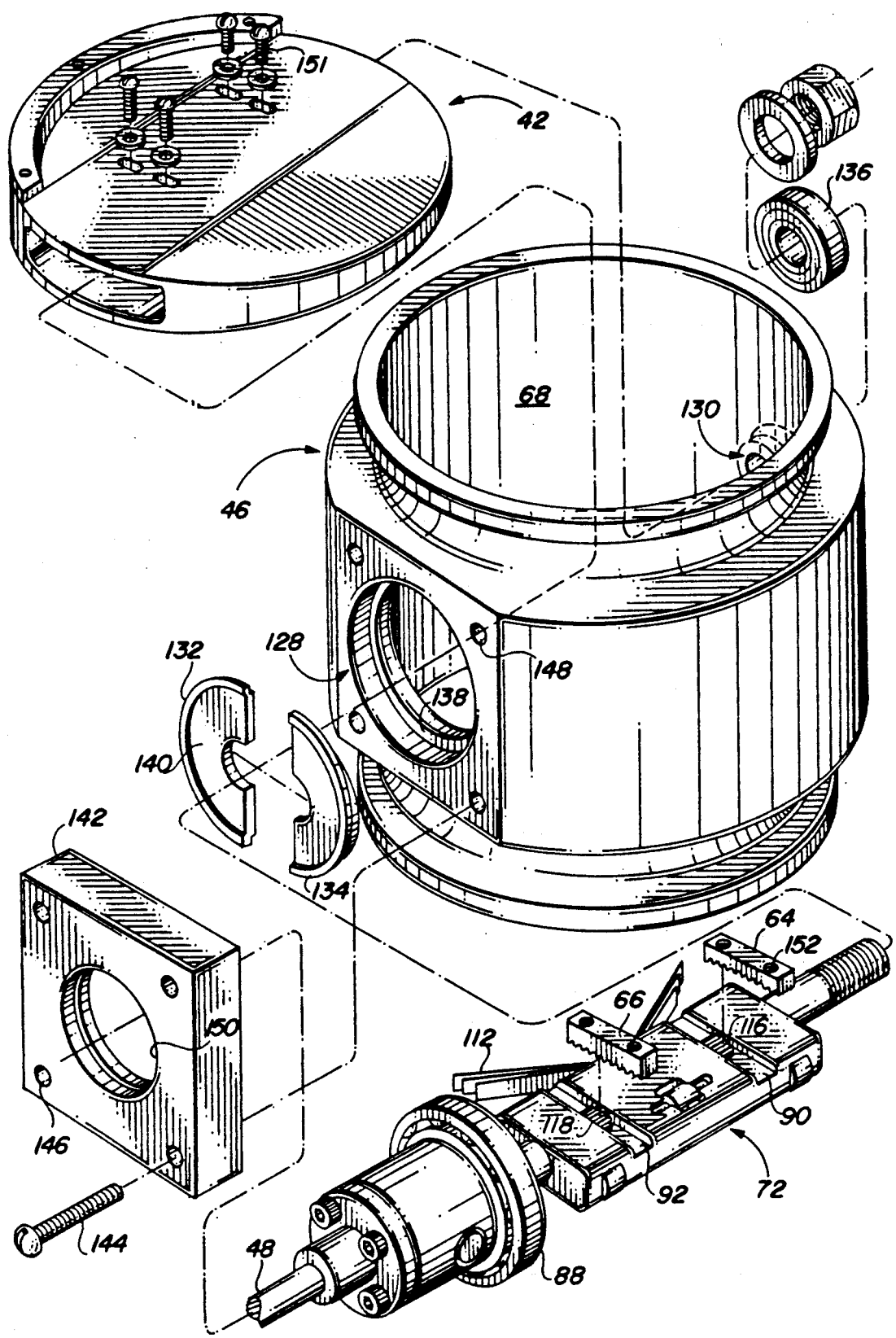
FIG. 2 is an exploded perspective view of the butterfly valve illustrated in FIG. 1.

FIG. 1 of the accompanying drawings illustrates a butterfly valve 40 which is operable via an external actuator 36 to control the position of a valve plate 42. The valve plate 42 is pivotally disposed in and transects a flow path 44 (FIG. 10) defined by a mounting body 46.

In use, duct members (not shown) are secured to the mounting body 46 to define an elongate flow path along which a fluid is conveyed from a source thereof, through the valve 40, and to one or more points of use. Fluid flow is controlled by rotationally positioning the valve plate 42. The positioning is achieved in response to torque applied by the actuator 36 to an input shaft 48. This torque is transmitted through a differential gear 50 (FIG. 3, hereinafter "differential") to a pivot mechanism 52 (FIG. 7) which pivotally supports the valve plate 42 and is journalled in the mounting body 46.

FIGS. 8 and 9 illustrate the valve plate 42 in more detail. The diameter of the circular valve plate 42 is slightly less than the inside diameter of the mounting body 46 in order to accommodate translational movement of the plate in the flow path 44. Translational movement of the valve plate 42 relative to the pivot mechanism 52 (FIG. 7) is accommodated by a suitably dimensioned cavity 54 extending through the plate as indicated. Slots 56, 58 are formed between the downstream-facing surface 60 of the plate and the cavity 54. Small tapped bores (not shown) extending into the plate receive screws 61 that secure an arcuate fence 62 to the plate near the leading edge of the latter. The slots 56, 58 are provided for securement of a pair of rack gears 64, 66 (FIG. 2) to the plate 42.

FIGS. 2, 3, and 7 illustrate the pivot mechanism 52 and differential 50 in detail. The pivot mechanism 52 comprises a center shaft 70 and a carrier shaft 72 (hereinafter, "carrier"). The carrier 72 has a centrally-disposed oblong portion 76 and two cylindrical end portions 78, 80. One end portion 78 is threaded for engagement with a nut 82, and the other end portion 80 has a transversely-extending bore 84 formed therethrough. A longitudinally-extending stepped bore 86 is formed in the carrier 72 to accommodate receipt of the center shaft 70 and to provide a housing for the differential 50. The bore 86 is sufficiently large in diameter to permit rotation of the center shaft 70 therein. Transverse slots 90, 92 are milled in the central portion 76, and through-slots 94, 96 are formed from the transverse slots to the upstream-facing surface 98 of the carrier. The through-slots 94, 96 intersect the longitudinally extending bore 86 as indicated. Five deep recesses (as at 100) and associated cross-slots (as at 102) are milled in the carrier 72 for installation of five rollers (as at 104). Each roller 104 is rotatably secured to a small shaft (as at 106) via needle bearings 107 (FIG. 6). The shaft 106 is force-fitted in the cross-slot 102. The rollers 104 function as bearings to minimize friction between the carrier 72 and the valve plate 42 during translational movement 109 (FIG. 10) of the latter. The longitudinally-extending bore 86 is enlarged at two locations and bearings 108, 110 are inserted. A bearing 88 is also pressed onto the cylindrical portion 80 as shown. A leaf spring 112 is rigidly secured to the edge of the carrier 72 via screws extending into tapped bores. (Note: Although the illustrated prototype incorporates the leaf spring 112, it is believed that a more robust biasing mechanism is preferable for most applications. Accordingly, the leaf spring 112 can be replaced by two suitably mounted and positioned coil springs, or such other functionally equivalent biasing means as are required in a given application).

A first bevel gear 114 of the differential 50 is pressed onto the center shaft 70 near the indicated end which extends into the differential housing. The center shaft 70 is received in the longitudinally-extending bore 86 and extends through the bearings 108, 110, and through two pinion gears 116, 118 positioned in the through-slots 94, 96 as illustrated.

A cross-shaft 120 is pressed through the cross-bore 84 and through needle bearings (not shown) received in the axial bores (not shown) of second and third bevel gears 122, 124. The fourth bevel gear 126 of the differential 50 is pressed onto the input shaft 48. The input shaft 48 extends through a stepped axial bore in an end cap 74 and is pressed through bearings seated in the latter. The end cap 74 is then secured to the end of PS-6331 the carrier 72 as indicated, with the fourth bevel gear 126 engaging the second and third 122, 124, and the latter two engaging the first 114 to form the differential 50.

It will be understood that the first and fourth bevel gears 114, 126 are rigidly secured to the center shaft 70 and input shaft 48, respectively, whereas the second and third bevel gears 122, 124 are rotatably secured to the cross-shaft 120. When rotational torque is applied to the input shaft 48, it is transmitted through the differential 50 to the center shaft 70. If the center shaft 70 is free to rotate, then it will do so in response to rotation of the input shaft 48. However, if the center shaft 70 is constrained from rotating, then the torque is transmitted to the carrier 72 via the cross-shaft 120.

The rack gears 64, 66 are positioned in the transverse slots 90, 92 and in engagement with the pinion gears 116, 118. The valve plate 42 is held inside the mounting body 46 and the leaf spring 112 is depressed as the pivot mechanism 52 is extended through an access port 128 and the cavity 54 (FIG. 9) until the threaded end portion 78 projects through on opposite port 130 formed through the mounting body.

Two semi-annular baffles 132, 134 are positioned around the carrier 72 between the bearing 88 and the central portion 76, and against an annular rim or boss 138 of the mounting body 46. The inside-facing surfaces (those not visible in FIG. 2) of the baffles 132, 134 are contoured to conform with the inner surface 68 of the mounting body 46, and the surfaces are flush when the baffles are positioned as described.

The pivot mechanism 52 is further extended through the cavity 54 until the bearing 88 abuts an annular land 140 defined by the baffles 132, 134. A cover plate 142 abuts the opposite side of the bearing 88 and is secured to the mounting body 46 via screws (as at 144) extending through bores (as at 146) and into tapped bores (as at 148). The cover plate 142 circumferentially surrounds the end portion 80 and the latter, along with the input shaft 48, projects through a central bore 150 in the cover plate.

The rack gears 64, 66 are rigidly secured to the valve plate 42 via screws (as at 151) extending through the slots 56, 58 (FIG. 8) and into tapped bores (as at 152) formed in the rack gears. A bearing 136 is pressed into the port 130 between the cylindrical portion 78 and the mounting body 46, and the pivot mechanism 52 is finally secured by tightly engaging the nut 82 with the threaded end portion 78.

When the valve 40 is assembled, the center shaft 70 is centered in relation to the valve plate 42 so that, in use, the net fluid dynamic torque is substantially zero when the plate is in the closed position. The leaf spring 112 is preloaded and abuts one transversely-extending, inside surface 154 (FIG. 9) of the valve plate 42, while the rollers 104 on the other end of the carrier 72 abut the opposite transversely-extending, inside surface 156. At all times, the rollers 104 collectively abut both oppositely-facing and longitudinally-extending inside surfaces (not referenced by numerals, these are the surfaces which are generally parallel to the valve plate as viewed in FIGS. 9 and 10) of the valve plate 42. Accordingly, the carrier 52 and rollers 104 cooperate to bear the pressure exerted by fluid on the valve plate so that load-bearing by the rack and pinion gears 64, 66; 116, 118 is limited to that associated with power transmission.

When the input shaft 48 is rotated, the rotational torque is transferred to the center shaft 70 and the normal response, in the absence of the leaf spring 112, is rotation of the center shaft 70. Rotation of the center shaft 70 is accompanied by translational movement 109 of the valve plate 42 relative to the carrier 72 via coaction of the rack and pinion gears 64, 66, 116, 118. If the translational movement is impeded sufficiently to prevent rotation of the center shaft 70, then the response to rotation of the input shaft 48 is rotation of the carrier 72 and, consequently, rotation of the valve plate 42. Since the oblong portion 76 of the carrier 72 is generally conformal with the cavity 54 (allowing, however, for translational movement and the provision of rollers 104), the valve plate 42 and carrier coact to rotate together when either is rotated; and since the cylindrical end portion 80 of the carrier extends outwardly from the flow path 44 and through the mounting body 46, the rotational position of the valve plate is easily ascertainable from the exterior of the mounting body by reference to the rotational position of the carrier.

Impedance of translational movement can occur without us of the leaf spring 112 when the valve plate 42 is in the closed position, since the plate is then forced edgewise against the inside surface 68 of the mounting body 46. However, such an arrangement requires considerably higher initial opening torque since the impedance is accompanied by frictional forces between the mounting body 46 and valve plate 42. Accordingly, the preferred embodiment incorporates a biasing mechanism so that rotational movement is the normal response when the valve plate 42 is moved from the closed position. In open rotational positions, the valve plate 42 moves rotationally in response to rotation of the input shaft 48 so long as impedance to rotational movement—the impedance resulting from net fluid dynamic torque—is insufficient to overcome the impedance to translational movement that results from the spring force. When the impedance to rotational movement is sufficiently high, (i.e. when the center of pressure 30 is sufficiently misaligned with the pivot line 32 as illustrated in FIGS. 12, the pivot line of the preferred embodiment being the longitudinal axis of the carrier 72), then the valve plate 42 moves translationally to decrease the net torque until the impedance is again insufficient to overcome that resulting from the spring force.

Figure 13:
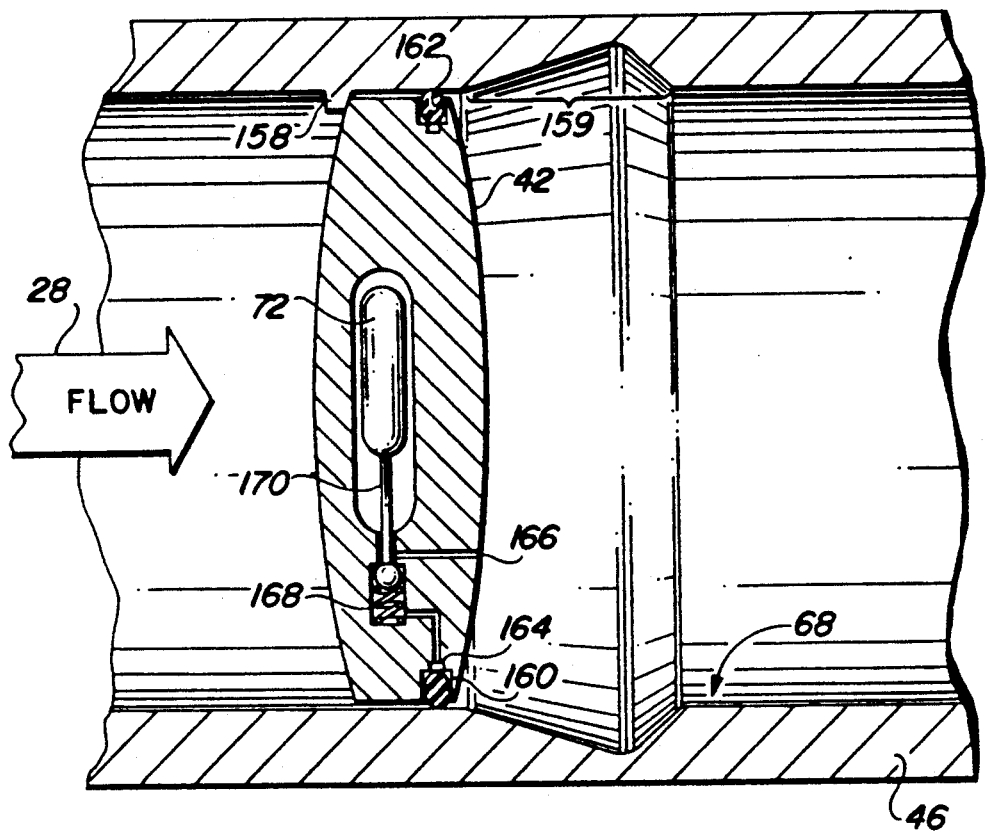
FIG. 13 is a schematic illustration wherein the butterfly valve incorporates a contemplated sealing arrangement in an application demanding a sealing function.

In applications which demand sealing in the closed rotational position, a conventional rim seal can be provided around the circumferential periphery of the valve plate 42. This may limit translational movement too much, which in turn may require suitable shaping of the inside surface 68 of the mounting body 46 in order to accommodate the required movement. Alternatively, a suitably shaped inside surface 46 in combination with face seals may be workable. FIG. 13 illustrates a contemplated arrangement in which fluid communication is sealingly closed with the valve plate 42 at a rotational angle of approximately zero. The mounting body 46 is adapted to provide a suitable stop 158 in order to prevent undesired rotational movement of the valve plate 42. To accommodate translational movement, the inside surface 68 of the mounting body 46 is radially extended over a range 159 immediately downstream from an annular recess 160 formed in the circumferential edge of the valve plate 42. The recess 160 is offset from the carrier 72 to provide circumferentially continuous sealing. A seal 162 is seated in the recess 160 and abuts the inside surface 68. A potential difficulty in butterfly valves which employ rim seals in high-pressure-ratio applications is that the high-pressure fluid on the upstream side of the valve plate 42 gets between the recess 160 and the seal 162. The fluid exerts radially outward force on the seal 162, which puts the seal in more aggressive contact with the inside surface 68. While that effect may be desirable for sealing purposes, it has the undesirable consequence of increasing the torque required to initially open the valve. Accordingly, in the FIG. 13 arrangement the valve plate 42 is adapted to provide one-way fluid communication from the recess 160 to the downstream side of the plate in order to relieve the forementioned outward pressure exerted on the seal 162. This is accomplished by forming an inner annulus 164 which fluidically connects the recess 160 to a flow passage 166. The passage 166 extends from the annulus 164 to the downstream-facing surface of the valve plate 42, and is blocked by a check valve 168. A push rod 170 is rigidly secured to the carrier 72 and is in contact with the check valve 168 so that a very slight translational movement of the valve plate 42 results in opening the check valve. In the closed position illustrated, the seal 162 impedes rotational movement of the valve plate 42 to a greater degree than the spring 112 (FIG. 2) impedes translational movement. Accordingly, when the valve plate 42 is sealingly closed as shown, rotation of the input shaft 48 (FIG. 2) results in rotation of the center shaft 70, and the valve plate is translated very slightly relative to the carrier 72. This slight translational movement opens the check valve 168, thus relieving the radially outward pressure exerted on the seal 162 and decreasing impedance to rotational movement of the valve plate 42. Use of the check valve 168 for both biasing (i.e. as an equivalent to the leaf spring 112 of FIG. 2) and seal-venting purposes is a possibility that has not been fully explored.

It should be understood that although a circular valve plate 42 is illustrated, the invention is equally applicable in a rectangular valve plate/rectangular duct arrangement, and that the term "butterfly valve" as used herein is intended to include such structures.

Figure 12A:
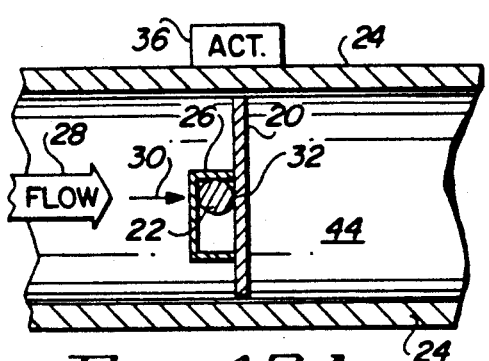
FIGS. 12A–12H are schematic illustrations of a balanced-torque butterfly valve showing various rotational and translational positions of the valve plate. These are provided for dual purposes of illustrating the principles of a balanced-torque butterfly valve, and illustrating the method of the invention.
Figure 12B:
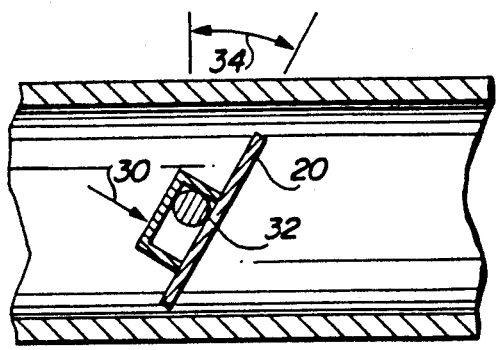
Figure 12C:
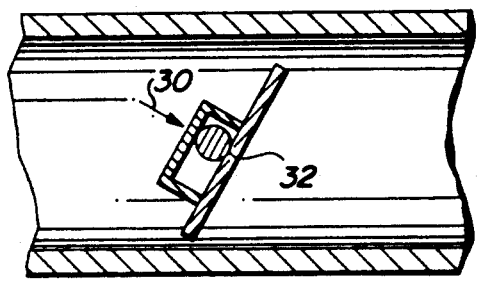
Figure 12D:
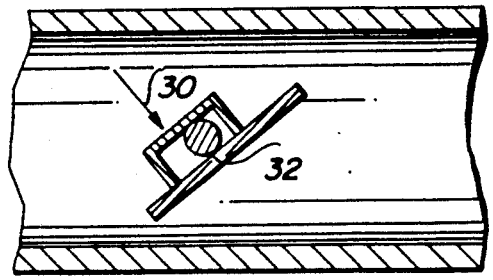
Figure 12E:
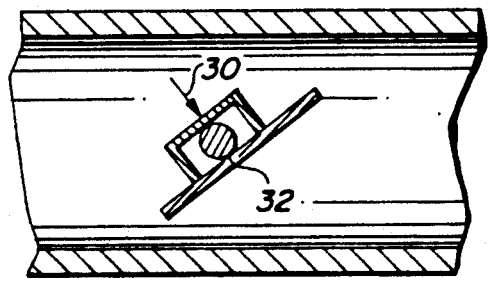
Figure 12F:
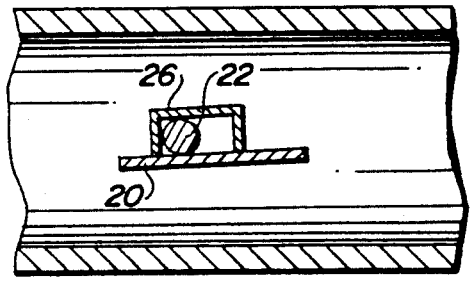

Referring now to FIGS. 12A-12F, it can be seen that in the method of the invention a valve plate 20 which is initially at a first rotational position (FIG. 12A) maximally closing fluid communication along the flow path 44, is rotationally moved away from the first position toward a second rotational position (FIG. 12F) maximally permitting fluid communication. The valve plate 20 is subjected to a net torque exerted by the fluid conveyed along the path 44 and the net torque increases with the rotational movement as the center of pressure 30 moves below the pivot line 32, this being illustrated in FIG. 12B. The valve plate 20 is translationally moved relative to the pivot shaft 22 so that the center of pressure 30 is more closely aligned with the pivot line 32, thus decreasing the net torque, as illustrated in FIG. 12C. Continued rotational movement toward the second position (FIG. 12F), facilitated by the translational movement, is effected with a concomitant increase in the net torque as the center of pressure 30 again moves relative to the pivot line 32, this being illustrated in FIG. 12D. Continued translational movement again more closely aligns the center of pressure 30 with the pivot line 32 so that further rotational movement toward the second position (FIG. 12F) is facilitated, as indicated in FIG. 12E.

Rotational movement of the valve plate 20 continues until the plate reaches a desired rotational position (as in FIG. 12E) associated with a desired flow rate. The translational movement facilitates the rotational movement and, since the net torque exerted by the fluid on the plate is minimized via the translational movement, minimizes the load on the actuator 36 at the desired rotational position.

The overall movement of the valve plate is characterized by both rotational and translational components, although it may be substantially continuous between one rotational position and another. Thus, the progression indicated by FIGS. 12A-12E exaggerates the discreteness of successive translational or rotational components of movement, to the end of providing an easily understood illustration of the overall movement.

Figure 12G:
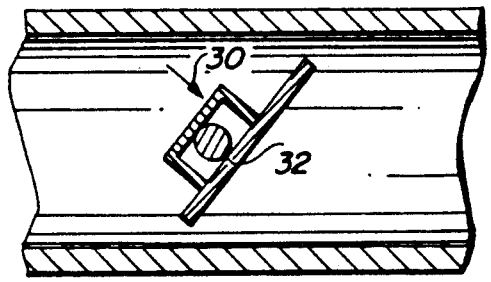
Figure 12H:
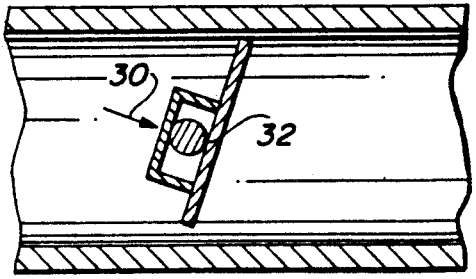

FIGS. 12G and 12H illustrate that the method of the invention can be practiced in reverse. That is, starting from a rotational position such as that illustrated in FIG. 12E where the valve plate 20 is substantially torque-balanced, the plate is rotationally moved toward the first position (FIG. 12A), thus effecting a greater degree of misalignment between the center of pressure 30 and the pivot line 32, as illustrated in FIG. 12G. The valve plate 20 is also translationally moved as illustrated in FIG. 12H to effect a lesser degree of misalignment, thus facilitating further rotational movement toward the first position.

The reader should understand that the foregoing portion of the description, which description includes the accompanying drawings, is not intended to restrict the scope of the invention to the preferred embodiment thereof or to specific details which are ancillary to the teaching contained herein. The invention should be construed in the broadest manner which is consistent with the following claims and their equivalents.

What is claimed is:

1. A butterfly valve comprising:
  a body defining a flow path therein for conducting a flow of fluid therethrough;
  a plate-like butterfly valve member spanning said flow path for closing the latter in a first position of said valve member wherein the latter is generally perpendicular to said flow path, said valve member pivoting about an axis traversing said flow path to a second position wherein said valve member spans said flow path and is generally parallel therewith to open the latter for flow of said fluid therein,
  operative input means for effecting pivotal movement of said valve member between said first and said second positions,
  kinematic means for translating said valve member generally in the plane thereof perpendicularly to said pivot axis in response to both said operative input means and pivotal movement of said valve member effected by fluid flow forces acting thereon; and
  inhibiting means wherein said first position of said valve member delaying translation thereof relative to said pivot axis in response to said operative input means whereby said valve member pivots from said first position through an initial opening angle substantially without translation.

2. The invention of claim 1 wherein said inhibiting means includes a yieldable resilient member biasing said valve member toward a respective first relative location thereof with said pivot axis which said valve member occupies in said first position thereof, said kinematic means being delayed in its operation during said initial opening angular movement of said valve member by said bias of said resilient member.

3. The invention of claim 2 wherein said yieldable resilient member includes an elongate leaf spring disposed generally parallel with said pivot axis and effective between the latter and said valve member to resist translation of said valve member from said first relative location.

4. The invention of Claim 2 wherein said yieldable resilient member is disposed to further resist translational movement of said valve member relative to said pivot axis incident to opening pivotal movement of said valve member beyond said initial opening angular movement.

5. A method of operating a butterfly valve having a duct wherein is conveyed a flow of fluid, a plate-like butterfly valve member disposed in said duct and pivotal about a pivot axis traversing said duct between a first closed position wherein said valve member spans and is generally perpendicular to said duct and a second open position wherein said valve member spans and is generally parallel with said duct, said valve member translating generally in the plane thereof generally perpendicularly to said pivot axis in response to pivotal movement thereof between said first and said second positions; said method comprising the steps of: pivoting said valve member from said first position through an initial opening angle toward said second position, and substantially inhibiting translational movement of said valve member relative said pivot axis during pivoting of said valve member through said initial opening angle.

* * * * *